Oct. 5, 1954   A. J. DELEHANTY   2,690,670
BLEED DOWN TESTER FOR HYDRAULIC VALVE LIFTERS
Filed July 14, 1951   2 Sheets-Sheet 1
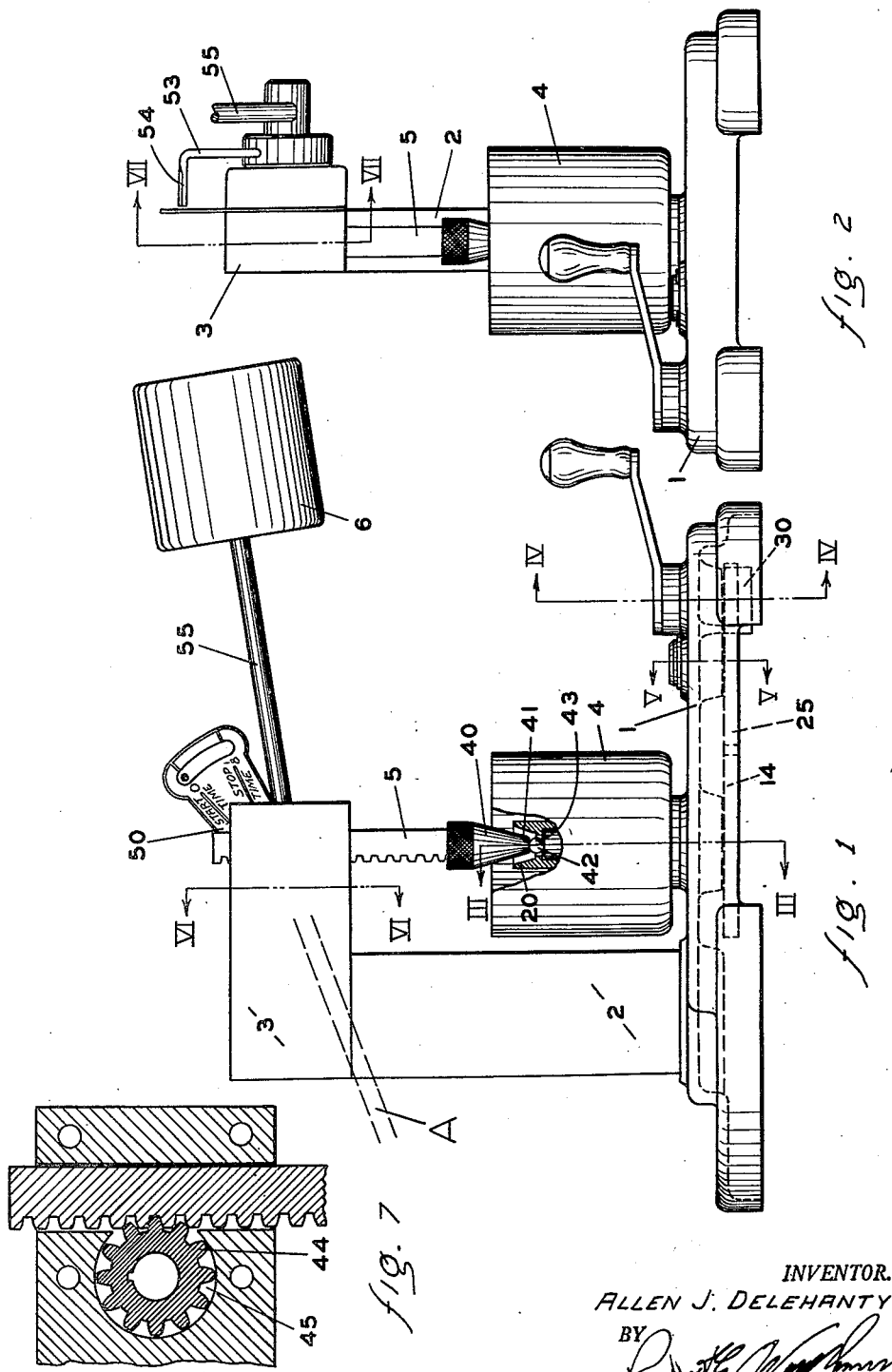
INVENTOR.
ALLEN J. DELEHANTY
BY

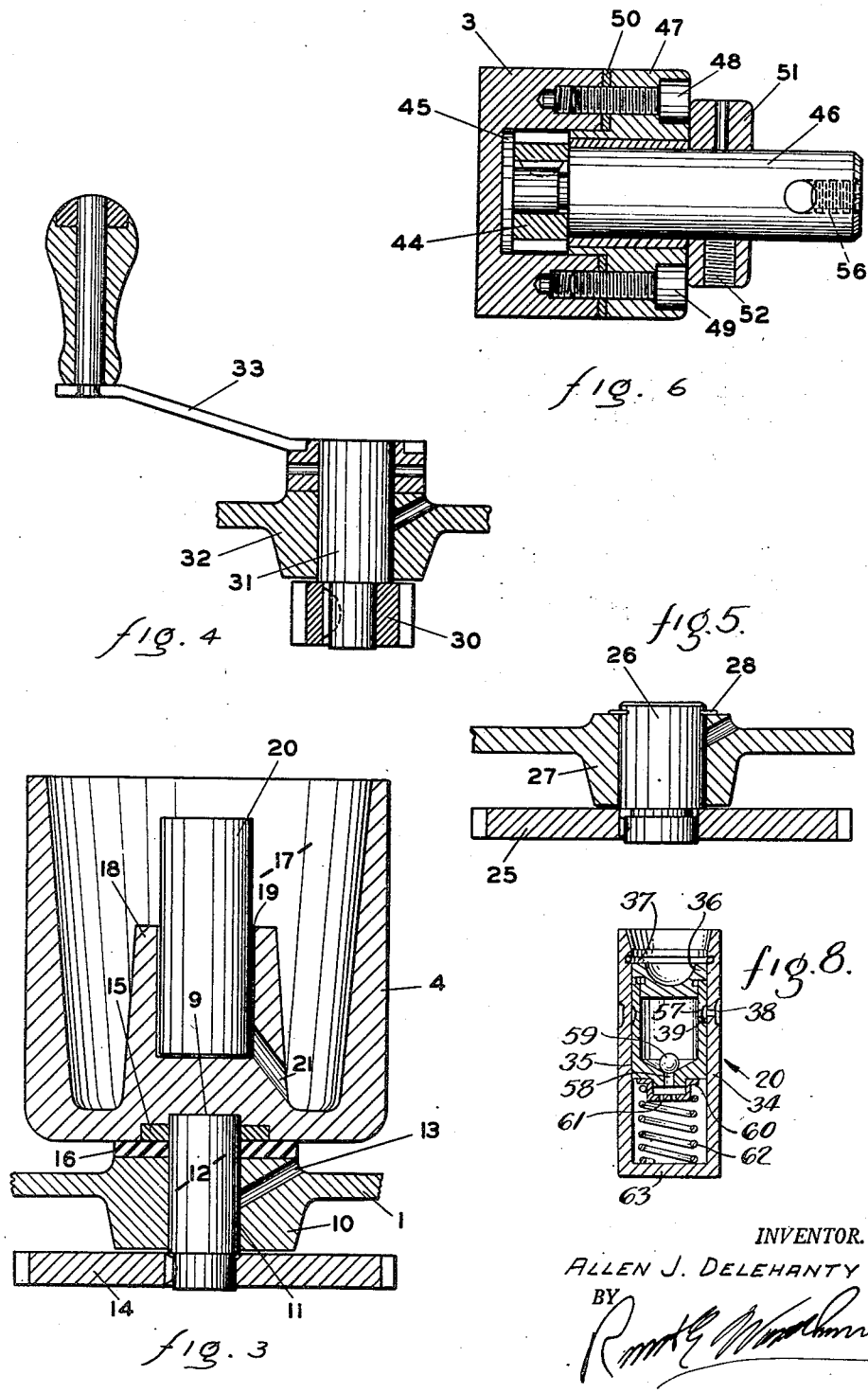

UNITED STATES PATENT OFFICE 2,690,670

BLEED DOWN TESTER FOR HYDRAULIC VALVE LIFTERS

Allen J. Delehanty, Kalamazoo, Mich., assignor to Borroughs Tool & Equipment Company, Kalamazoo, Mich., a corporation of Michigan Application July 14, 1951, Serial No. 236,835

5 Claims. (Cl. 73—119)

This invention relates to a testing device for a hydraulic valve lifter and it relates particularly to a type thereof by which is measured the time required for the plunger of said lifter to move a predetermined distance under a standard force.

In the manufacture of hydraulic valve lifters, it becomes desirable, as a part of the inspection procedure, to ascertain the clearance between the plunger of the hydraulic valve lifter and the walls of the cylinder within which said plunger is contained, and it is desirable that such testing be accomplished under conditions as near as possible to those existing in actual use of the valve lifting device. Previous apparatus offered to the market for carying out this purpose has provided means by which the valve lifter was immersed in, and filled with, oil and a standard force placed onto the plunger of the lifter. A variety of means were then employed for measuring the time required for the lifter plunger to move against the body of oil. One method previously employed has been to compare the movement of the plunger in a lifter under test with the corresponding movement of the plunger in a standard lifter.

These previous devices, however, did not produce sufficiently accurate results in that it was frequently observed that the same test specimen would give different results when placed in the testing device in different positions.

Accordingly, it is a major object of this invention to provide means for testing a hydraulic valve lifter to determine whether or not the clearance between the plunger and the walls of the cylinder surrounding the plunger is satisfactory.

A further object of this invention is to provide a testing device, as aforesaid, which will give consistent results.

A further object of the invention is to provide a testing device, as aforesaid, in which the force applied to the valve lifter plunger will be substantially co-axial with the plunger itself.

A further object of the invention is to provide a testing device for a hydraulic valve lifter which will compensate for any misalignment between the plunger of the test specimen and the direction of application of an applied force.

A further object of the invention is to provide a testing device for a hydraulic valve lifter, as aforesaid, which will be of sufficient mechanical simplicity as to be capable of inexpensive fabrication.

A further object of the invention is to provide a testing device for a hydraulic valve lifter which will be of sufficient mechanical simplicity that it will be easy to operate even by only moderately skilled personnel.

A further object of the invention is to provide a testing device for a hydraulic valve lifter, as aforesaid, which will not require much maintenance. If and when it does require maintenance, it can be readily and easily supplied.

Other objects and purposes of the device will be apparent to persons acquainted with apparatus of this general type.

In the figures:

Figure 1 represents a general side view of an embodiment of my invention showing the cup partially broken and a typical valve lifter partially in central section.

Figure 2 is an end view of my testing device taken from the right side with reference to the showing in Figure 1.

Figure 3 represents a section taken on the line III—III of Figure 1.

Figure 4 represents a section taken of the line IV—IV of Figure 1 and including a cutting plane centrally through the handle.

Figure 5 represents a section taken on the line V—V of Figure 1.

Figure 6 represents a section taken of the line VI—VI of Figure 1.

Figure 7 represents a section taken of the line VII—VII of Figure 1.

Figure 8 represents a central sectional view of a typical valve lifter.

General description

In meeting the objects and purposes above set forth, I have provided a cup shaped compartment for receiving and holding the valve lifter to be tested and I have provided in association therewith a vertically movable plunger, driven through a rack and gear arrangement by a weight, for applying a precisely regulatable force onto the plunger of the valve lifter. Associated with said chamber are means, preferably manually driven, by which said chamber may be rotated simultaneously with the application of said force and so rotated with sufficient rapidity that any possible misalignment existing between the plunger of the valve lifter and the plunger by which the force is applied thereto is equalized and consistent results are obtained.

Detailed description

Referring to the drawing, a base 1 supports a standard 2 which in turn supports an arm 3. On said base is rotatably mounted the cup 4 and on the end of said arm is mounted a vertically reciprocable rack 5 and the mechanism including a weight 6 for driving same.

Referring to Figure 3, said base 1 includes a bearing housing 10 having an opening 11 therethrough for the reception of the shaft 12. An oil hole 13, or other conventional lubricating means, is preferably also provided. Said shaft 12 carries a gear 14 at its lower end and carries a pin 15 at its upper end. A fiber washer 16 rests on the upper surface of said bearing housing 10 and bears against the lower side of said pin 15 to support same and thereby to support said shaft and gear.

The cup 4 has on its underside an opening 9 for receiving the upper end of the shaft 12 and has also a slot for receiving the pin 15. Thus, rotation of the gear 14 will rotate the cup 4. Within the chamber 17 of said cup there is a hollow boss 18 having an internal opening 19 therein for reception of a test specimen of the valve lifter 20. An opening 21 provides communication from the bottom of the internal opening 19 to the bottom of the chamber 17 of said cup for purposes appearing hereinafter.

The valve lifter 20 comprises a tubular shell 34 closed on its bottom end 63. Within the shell 34 is a plunger 35 closed by the cap 36. The plunger 35 and cap 36 are held against escape from the shell 34 by the retaining spring 37 at the open end of the shell 34. The plunger 35 is hollow, having a frusto-conical valve seat at its lower end for receiving the ball valve 59. The ball valve closes the orifice 58 extending from within the plunger 35 to the lower portion of the chamber in the shell 34. The lower end of the orifice 58 has a cover 60 perforated with holes 61. The plunger 35 is held against the retaining spring 37 by the compression spring 62. Hydraulic fluid enters the valve lifter through the port 38. The plunger 35 has an external channel 39 and a port 57 by which the fluid may pass to the chamber within the plunger 35. The construction for the valve lifter 20 is illustrative only.

As shown in Figure 5, an intermediate gear 25 is rotatably supported by a shaft 26 in an intermediate bearing member 27 and same is held in place by any conventional means, such as the snap ring 28.

As appearing in Figure 4, a driving pinion 30 is keyed to a shaft 31 and same is rotatably supported in a bearing member 32. A crank handle 33 is supported in a conventional manner on the upper end of the shaft 31 in driving relationship therewith. Said driving pinion 30 meshes with the intermediate gear 25 and said intermediate gear meshes with the gear 14. Thus, rotation of the crank handle 33 by the operator will rotate the cup 4 at a desired and controllable speed.

Referring now to Figures 1, 2 and 7, the reciprocable rack 5 supports at its lower end a nose piece 40 which has a hardened tip 41. The ball 42 rests against the valve rod seat 43 of the valve lifter. The nose piece 40 is affixed to the lower end of the reciprocable rack 5 in any convenient manner, as by a threaded connection. Said rack 5 extends through the arm 3 and meshes with the pinion 44 which is disposed within the chamber 45.

Said pinion 44 is mounted on a shaft 46 (Figure 6) which is supported by the bearing support member 47. Said bearing support member 47 is held onto the arm 3 by the screws 48 and 49. The quadrant 50, on which is marked "Start time" and "Stop time" legends, is held, as best shown in Figure 6, between the bearing support member 47 and the arm 3.

A collar 51, adjustably held with respect to the shaft 46 by a set screw 52 is positioned closely adjacent the bearing support member 47 and supports the pointer arm 53 which in turn supports the indicator 54. Said indicator cooperates with the quadrant 50 for indicating the position of the shaft 46 as hereinafter described.

The weight 6 is supported by the arm 55 which in turn is received into the shaft 46 and held therein by a set screw 56.

*Operation*

Commencing with the weight 6 turned counter-clockwise so that its arm 55 occupies substantially the position shown at A in Figure 1, the valve lifter 20 is placed into the internal opening 19 of the hollow base 18 and the cup 4 is sufficiently filled with oil to cover said valve lifter 20. With the hard steel ball 42 placed in position on the valve rod seat 43, i. e. on the plunger, of the valve lifter, the weight 6 is moved clockwise until the hardened tip 41 of the nose piece 40 just touches said ball. The weight is now moved up and down whereby the lifter is pumped full of oil. The port 38 is above the hollow base 18. Reciprocating movement of the plunger 35 causes the hydraulic fluid to flow into the plunger 35 and past the ball valve 59 until both the plunger 35 and the lower portion of the shell 34 are full. With the nose piece 40 just touching the steel ball but exerting no measurable weight on it, the set screw 52 is loosened, the indicator 54 so arranged with respect to the shaft 46 that at this point it is coincident with the "Start time" designation on the quadrant, and the set screw 52 again tightened. (This adjustment is preferably made at the factory but may be made by the user where desired.) The weight 6 is now released and allowed to exert pressure through the nose piece 40 and the ball 42 onto the plunger of the valve lifter 20. Simultaneously, the operator, through the crank handle 33, causes the cup 4 to rotate at whatever rate has by experience been determined as best for the particular test then being conducted. Normally, as of the present time, it has been found desirable to rotate the cup once in about six seconds, but this is merely by way of illustration and is in no sense limiting.

The test may be stopped upon the elapsing of a predetermined period of time or it may be stopped when the indicator reaches the "Stop time" line on the quadrant 50. The test may be made standard at a predetermined time, as a twenty-one seconds, in which case the acceptance or rejection of a particular part will depend upon whether the indicator 54 has exceeded certain predetermined limits with respect to the "Stop time" line. Conversely, if the test is stopped when the indicator reaches said "Stop time" line, then the acceptance or rejection of the specimen of the valve lifter will depend upon whether or not the measured time elapsing from "Start time" to "Stop time" exceeds or falls short of certain predetermined minimum or maximum limits.

The use of a ball 42 between the nose pice 40 and the plunger of the valve lifter assists in directing the force exerted by the weight 6 onto said plunger in a line perpendicular with respect to the upper surface of said plunger. Simultaneously, the rotation of the cup 4 insures that the effect of any lack of coincidence between the axis of said plunger and the line of application of force thereto will be distributed throughout the entire periphery of said plunger, (as it may be caused to bear against a wall of the cylinder surrounding the plunger by said non-coincident force) sufficiently that such lack of coincidence does not spoil the accuracy of the test and said test will give consistently reproducible results.

Accordingly, I have provided a device capable of meeting the objects and purposes above set forth.

While I have shown one preferred embodiment of my invention for the purposes of illustration herein, it must be understood that the principles of my invention may be embodied in other specific apparatus and hence such other apparatus is to be also included within the scope of the hereinafter appended claims, excepting as said claims by their own terms expressly limit otherwise.

I claim:

1. In a testing device for a hydraulic valve lifter, the combination comprising: a cup, and means within said cup for supporting said hydraulic valve lifter in such position that the longitudinal axis thereof is concentric with the axis of symmetry of said cup; a base; means rotatably mounting said cup above said base; a gear and means affixing said gear below said base for rotation with said cup; a crank rotatably mounted on said base; a gear train connecting said crank to said gear; a standard mounted on said base and supporting an overhanging arm extending over said cup; a rack reciprocably held by said arm and mounted in such position that its central longitudinal axis is coincident with the axis of rotation of said cup; means at the lower end of said rack for engaging a ball held at the upper end of a test specimen; weight driven means for urging said rack in a downward direction.

2. The invention defined in claim 1 wherein said last named means comprises: a pinion held within said arm and in operable engagement with said rack; a shaft extending from said pinion and bearing means supported by said arm holding said shaft and said pinion in operating position; a pointer adjustably mounted on said shaft and a weight supporting arm also mounted on said shaft so that the force of gravity acting on said weight tends to rotate said shaft.

3. In a testing device for a hydraulic valve lifter, the combination comprising: a standard including a base and an upstanding arm; a cup mounted on said base for rotation about its geometric axis; means mounted on said base for so rotating said cup; a hollow boss in said cup concentric with the axis of rotation of said cup, said boss adapted to receive a hydraulic valve lifter; a vertically reciprocable rack mounted on said arm and vertically aligned with the axis of rotation of said cup, said rack being adapted to bear upon a ball seated on a hydraulic valve lifter received into said hollow boss; a weight adapted to urge said rack downwardly; an indicator for registering the travel of said rack.

4. In a testing device for a hydraulic valve lifter, the combination comprising: a cup, and means within said cup for supporting said hydraulic valve lifter in such position that the longitudinal axis thereof is concentric with the axis of symmetry of said cup; a base; means rotatably mounting said cup above said base; manually driven means for rotating said cup; a standard mounted on said base and supporting an overhanging arm extending over said cup; a rack reciprocably held by said arm and mounted in such position that its central longitudinal axis is coincident with the axis of rotation of said cup; means at the lower end of said rack for engaging a ball held at the upper end of a test specimen; weight driven means for urging said rack in a downward direction.

5. In a testing device for a hydraulic valve lifter, the combination comprising: a cup, and means within said cup for supporting said hydraulic valve lifter in such position that the longitudinal axis of said valve lifter is concentric with the axis of symmetry of said cup; means rotatably mounting siad cup with said axis in a vertical position; manually controllable means for rotating said cup; a plunger and a support reciprocably mounting said plunger above said cup in such position with respect to said cup that the longitudinal central axis of said plunger is coincident with the axis of rotation of said cup; means at the lower end of said plunger for engaging a ball held at the upper end of a hydraulic valve lifter under test; means applying a constant force urging said plunger in a downward direction.

References Cited in the file of this patent
UNITED STATES PATENTS

| Number | Name | Date |
|---|---|---|
| 1,145,924 | Russell | July 13, 1915 |
| 2,072,912 | Von Heydekampf | Mar. 9, 1937 |
| 2,263,801 | Graham | Nov. 25, 1941 |
| 2,334,970 | Voorhies | Nov. 23, 1943 |
| 2,619,835 | Albaugh | Dec. 2, 1952 |